Patented Aug. 7, 1945

2,381,257

UNITED STATES PATENT OFFICE 2,381,257

INSECTICIDE COMPOUND AND METHOD OF DISPENSING AN INSECTICIDE

Frank Leslie Campbell and Willis Conard Fernelius, Columbus, Ohio

No Drawing. Application July 24, 1941, Serial No. 403,873

3 Claims. (Cl. 167—39)

The object of this invention is to provide an insecticide, preferably in a solid or liquid form which, when exposed to atmospheric pressure and room temperature, will release a toxic gas for the destruction of insect life. Heretofore, such gases as sulfur dioxide have not been available for commercial use in readily usable form due to the fact that sulfur dioxide was only available as a gas or liquid under compression. This made it difficult, if not impossible, for an unskilled operator to utilize sulfur dioxide unless by the use of such unsatisfactory methods as burning sulfur candles.

It is the object of this invention to provide a volatile compound containing $SO_2$ that is readily split or decomposable when exposed to the air at room temperatures and at atmospheric pressure so that it may be packed and shipped in containers which, when opened, permit of the ready use of the sulfur dioxide.

It is a further object of the invention to provide a readily decomposable sulfur compound in which the donor element of the compound is toxic to insect life in addition to the toxic character of the sulfur compound itself and in this way to provide a compound of high toxicity and potency in the destruction of insect life. It will be understood that one of the advantages of sulfur dioxide is the fact that it is both toxic to insect life and is not necessarily, in most cases, injurious to things other than insect life.

It is a further object of this invention to utilize the relatively inert character of sulfur dioxide in order to dilute the oxygen content of an enclosure when certain donor compounds are utilized which otherwise might form an explosive mixture when used as an insecticide. This sulfur dioxide will reduce or eliminate flammability of the other insecticides linked with it.

In practice, these compounds are produced by the combination of sulfur dioxide with one or more of a series of donor compounds containing nitrogen or oxygen of the general classes of amines, ethers, alcohols, esters, ketones, nitriles, sulfides and other organic compounds, with the exception of onium types of compounds containing either nitrogen or oxygen.

The result to be secured in each instance is to provide a compound from which the sulfur dioxide will escape when exposed to the air at atmospheric pressure and room temperature and will be so regulated in its escape by reason of the fact that the decomposable compound is either a solid or a liquid that a suitable progressive distribution of sulfur dioxide or of sulfur dioxide and the donor compound will be effected and will bring about a suitable rate of distribution during its decomposition.

To summarize, the object of the invention is (1) to provide an insecticide that is a volatile liquid or solid at room temperature and at atmospheric pressure and that contains a high percentage of $SO_2$ in chemical combination with another substance that also has insecticidal value. Upon exposure to the atmosphere this loose chemical combination volatilizes and splits, releasing $SO_2$ gas and the vapor of the other substance. (2) To provide an insecticide that is a volatile liquid at room temperature and pressures above atmospheric (in steel cylinders or sealed cans) and that contains a high percentage of $SO_2$ in chemical combination with another substance that also has insecticidal value. Upon opening the container the loose chemical combination splits and is released as a gas of $SO_2$ and of the other substance.

The advantages to be expected in the use of such combinations with $SO_2$ depend on the nature of the combining substance and on biological and environmental factors. We list certain advantages:

1. The compound with $SO_2$ is a liquid or a solid at room temperatures and atmospheric pressure.

(a) The marketing and application of sulfur dioxide is facilitated, because the insecticide can be supplied in non-returnable cans or bottles and applied by the various methods of dispersion and evaporation now commonly used for other insecticides that boil above room temperatures at atmospheric pressure. Heretofore $SO_2$ has had to be generated on the job by burning sulfur or carbon disulfide in diatomaceous earth, or by releasing it from steel cylinders. The generation of $SO_2$ by burning sulfur has the following disadvantages: fire hazard, deposition of a film of sulfur on furniture, etc., slow buildup of concentration of $SO_2$ in the space under fumigation. The burning of carbon disulfide in diatomaceous earth to produce $SO_2$ is said to have none of these disadvantages except fire hazard incident to any use of carbon disulfide. The release of $SO_2$ from steel cylinders is simple and has none of the above disadvantages but requires the use of a heavy returnable container. Special piping of the gas may be required. The use of any gas from steel cylinders is practically limited to professional fumigators. Our invention has none of the disadvantages listed above and is amenable to more general and less technical application.

(b) Where the insecticide linked with $SO_2$ is flammable, $SO_2$, which is nonflammable, will reduce or eliminate the flammability of the other fumigant.

(c) Where the insecticide linked with $SO_2$ has no warning odor, $SO_2$, which has a warning odor at harmless concentrations, will prevent accidents. No one can remain in an enclosure being fumigated with $SO_2$.

(d) In situations where SO₂ may cause damage to textiles, metals, etc., the linkage of SO₂ to another insecticide which never causes such damage will reduce the concentration of SO₂ necessary to control the insects and lessen the possibility of damage to commodities or furnishings by SO₂.

(e) Synergistic action (effect of mixtures or compounds greater than that to be expected from the sum of the effects of the components) may be produced by the materials suggested in this invention.

2. The compound with SO₂ is a liquid at room temperatures and pressures above atmospheric.

As examples of such compounds and their making, we list the following:

EXAMPLE I

*Molecular compound of sulfur dioxide and ethylene oxide—For use as an insecticide*

Sulfur dioxide (1 mole) is passed into ethylene oxide at a temperature substantially below 0° centigrade. This resulting compound is a liquid and is confined until its use. When opened into the atmosphere it volatilizes. In this instance the donor product, as well as the sulfur dioxide, is toxic to insect life.

The formula of the resulting compound is $$C_2H_4O \cdot SO_2$$

EXAMPLE II

*Molecular addition compound of sulfur dioxide and dioxan—For use as an insecticide*

Sulfur dioxide (1 to 2 moles) is passed into dioxan at room temperature. In the event that the amount of sulfur dioxide to be contained in the ultimate compound is to be increased, then the temperature of the dioxan is reduced to 0° centigrade and then at that point the maximum of sulfur dioxide can be introduced into the dioxan to produce this molecular compound with the maximum of sulfur dioxide content. The resulting product is not changed in appearance from the dioxan.

The formulas of the resulting compounds are $$C_4H_8O_2 \cdot SO_2$$

$$C_4H_8O_2 \cdot 2SO_2$$

EXAMPLE III

*Molecular addition compound of sulfur dioxide and trimethylamine—For use as an insecticide*

1. Sulfur dioxide (1 mole) is passed slowly into a cold (0°) solution of trimethylamine (1 mole) in anhydrous petroleum ether (boiling range 30–60°). The insoluble addition product, $$(CH_3)_3N \cdot SO_2$$

is filtered quickly on a Büchner funnel, washed with cold petroleum ether and dried in a vacuum desiccator over concentrated sulfuric acid: melting point 76° in a sealed tube; the yield is practically theoretical. This resulting compound is a solid.

The formula of the resulting compound is $(CH_3)_3N \cdot SO_2$.

2. Sulfur dioxide (1 mole) is passed slowly into a cold (0°) solution of trimethylamine (1 mole) in anhydrous benzene. The addition compound is precipitated by the addition of anhydrous petroleum ether and then washed and dried as in (1). This resulting compound is a solid.

The formula of the resulting compound is $(CH_3)_3N \cdot SO_2$.

3. Sulfur dioxide (1 mole) is condensed in a tube held below −10° and containing trimethylamine (1 mole). The reaction is vigorous at temperatures as low as −117°. Any excess of either reagent may be pumped off. This yield is quantitative. This resulting compound is a solid.

The formula of the resulting compound is $(CH_3)_3N \cdot SO_2$.

EXAMPLE IV

*Molecular addition compound of sulfur dioxide and triethylamine—For use as an insecticide*

Sulfur dioxide (1 mole) is passed slowly into a cold (0°) solution of triethylamine (1 mole) in petroleum ether (boiling range 30–60°). The red insoluble oil which settles to the bottom of the reaction vessel is separated from the petroleum ether by means of a separatory funnel and purified by distillation: boiling point (at 742 mm.) 95°; the freezing point is −31.8°. This resulting compound is a liquid.

The formula of the resulting compound is $(C_2H_5)_3N \cdot SO_2$.

EXAMPLE V

*Molecular addition compound of sulfur dioxide and dimethyl aniline—For use as an insecticide*

Sulfur dioxide (1 mole) is passed into a cold (0°) solution of dimethyl aniline (1 mole) in petroleum ether (boiling range 30–60°). The red oil is separated from the petroleum ether in a separatory funnel: melting point 12°, density $1.08^{27°}$. This oil cannot be distilled at 10 mm. pressure but can be stored indefinitely in a stoppered flask.

The formula of the resulting compound is $C_6H_5(CH_3)_2N \cdot SO_2$.

EXAMPLE VI

*Molecular addition compound of sulfur dioxide and acetone—For use as an insecticide*

Sulfur dioxide (1 mole) is passed into acetone (1 mole) at a temperature of 0° degrees centigrade or lower. The resulting product is not changed in appearance from the acetone.

The formula of the resulting compound is $C_3H_6O \cdot SO_2$.

It will be understood that we desire to comprehend within our invention such modifications as come within the scope of the claims and the invention.

Having thus fully described our invention what we claim as new and desire to secure by Letters Patent is:

1. The method of killing insects which comprises exposing insects to the sulfur dioxide addition compound of acetone which gradually decomposes at approximately room temperature and atmospheric pressure to release sulfur dioxide vapors and acetone vapors in a toxic volume.

2. A process for killing insects which comprises vaporizing the addition product of acetone and sulfur dioxide having the formula $(CH_3)_2CO \cdot SO_2$ and exposing said insects to the resultant vapors.

3. A process for fumigating an insect-infested enclosure which comprises vaporizing at atmospheric pressure within said enclosure the addition product of acetone and sulfur dioxide having the formula $(CH_3)_2CO \cdot SO_2$ in an amount sufficient to kill all insects within said enclosure.

FRANK LESLIE CAMPBELL.
WILLIS CONARD FERNELIUS.